United States Patent
Ekholm et al.

[19]

[11] Patent Number: 6,059,323
[45] Date of Patent: May 9, 2000

[54] EXPANSION UNIT FOR PIPING ADJUSTMENT

[75] Inventors: Rolf Ekholm; Ulf Jansson, both of Karlstad, Sweden

[73] Assignee: Kvaerner Pulping AB, Sweden

[21] Appl. No.: 09/051,435

[22] PCT Filed: Jul. 28, 1995

[86] PCT No.: PCT/SE95/00891

§ 371 Date: Apr. 7, 1998

§ 102(e) Date: Apr. 7, 1998

[87] PCT Pub. No.: WO97/05419

PCT Pub. Date: Feb. 13, 1997

[51] Int. Cl.[7] .................................................. F16L 21/02
[52] U.S. Cl. ...................... 285/224; 285/231; 285/248; 285/302; 277/603
[58] Field of Search .................................. 285/231, 232, 285/233, 234, 235, 224, 298, 302; 277/417, 603, 602, 614, 616, 627, 534, 529

[56] References Cited

U.S. PATENT DOCUMENTS

| | | | |
|---|---|---|---|
| 1,873,590 | 8/1932 | James | 285/231 |
| 2,425,662 | 8/1947 | Wolfram | 285/234 |
| 2,451,070 | 10/1948 | Chamberlain | 285/231 |
| 2,649,315 | 8/1953 | Ipsen | 277/602 |
| 3,405,957 | 10/1968 | Chakroff | 285/233 |
| 3,596,938 | 8/1971 | Tizzard | 285/231 |
| 3,695,639 | 10/1972 | Shire et al. | 285/231 |
| 5,106,129 | 4/1992 | Camacho et al. | 285/233 |
| 5,458,343 | 10/1995 | Dornfeld et al. | 277/503 |

FOREIGN PATENT DOCUMENTS

| | | | |
|---|---|---|---|
| 1203752 | 1/1960 | France | 285/231 |
| 2058203 C2 | 6/1982 | Germany . | |
| 2853726 C2 | 11/1982 | Germany . | |
| 3319729 | 12/1983 | Germany | 277/417 |
| 3333729 A1 | 4/1985 | Germany . | |
| 468586 | 3/1969 | Switzerland | 285/231 |
| 1083345 | 9/1967 | United Kingdom . | |

*Primary Examiner*—Eric K. Nicholson
*Attorney, Agent, or Firm*—Fasth Law Offices; Rolf Fasth

[57] ABSTRACT

An expansion coupling, for connecting a first conduit to a second conduit, has a housing that is open at opposite ends thereof. The conduits and at least one end of the housing have sealing means that comprise an interior sealing ring and an exterior sealing ring that has a larger external and internal diameter than the interior sealing ring. The interior sealing ring has a radially inwardly directed sealing surface and the exterior sealing ring has a radially outwardly directed sealing surface. The sealing rings have sealing side surfaces for sealing against adjacent sealing rings and the sealing rings are radially displaceable with respect to each other to accommodate for any misalignments of connected conduits.

8 Claims, 2 Drawing Sheets

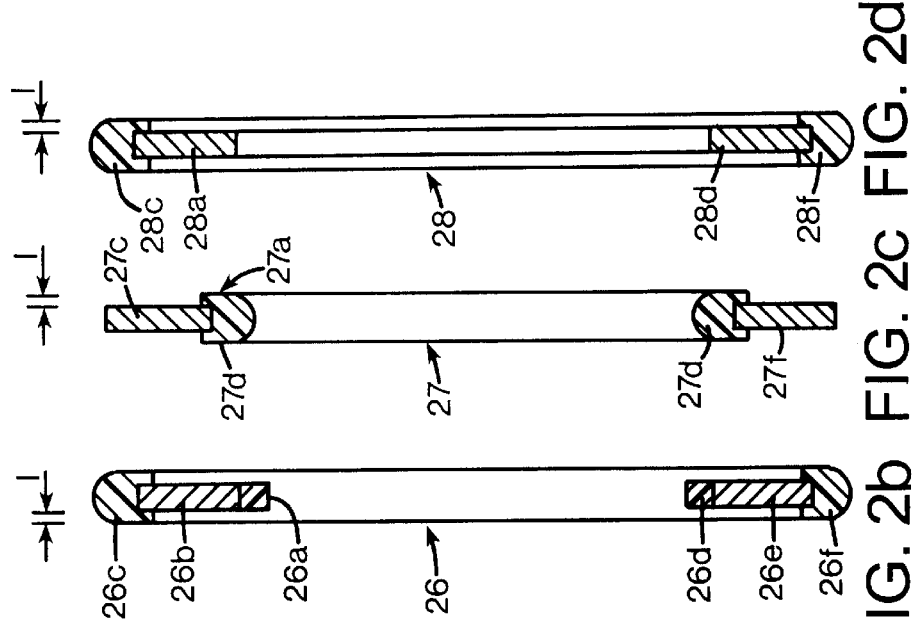
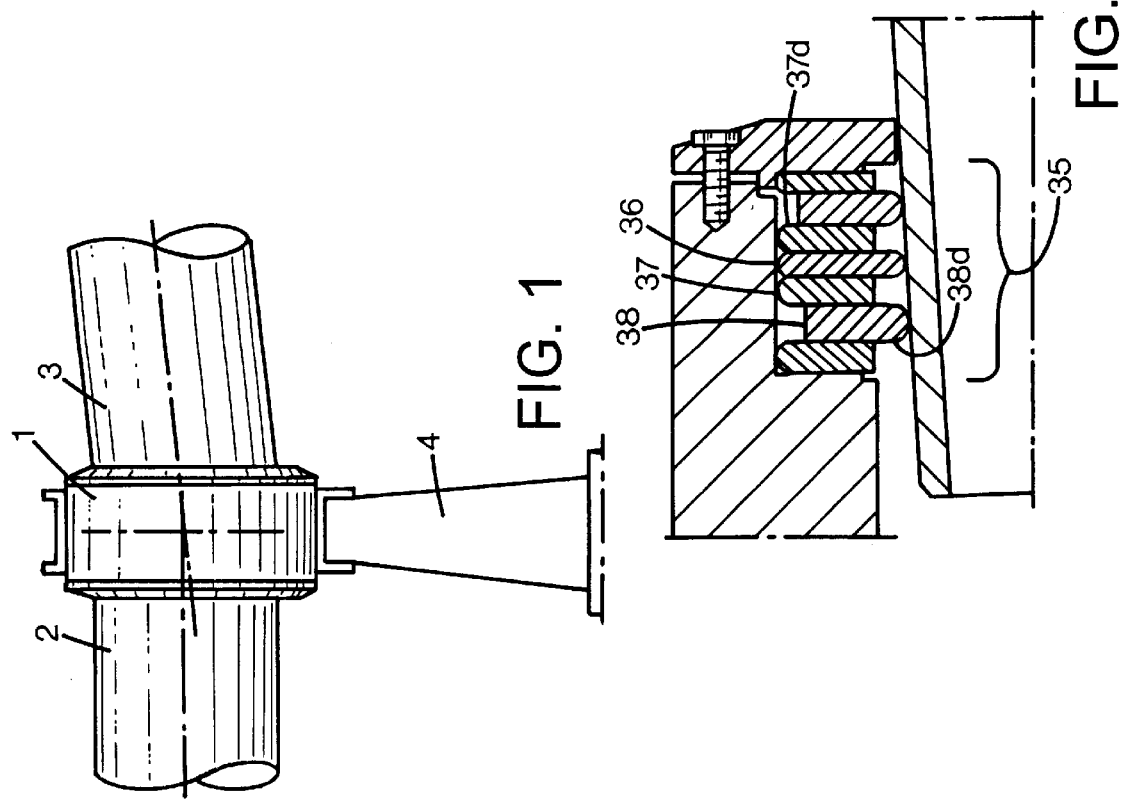

EXPANSION UNIT FOR PIPING ADJUSTMENT

TECHNICAL FIELD

The invention relates to expansion units of the type used to connect two and seal together two conduits.

BACKGROUND INFORMATION AND SUMMARY OF THE INVENTION

In the process industry it often happens that pipes used to transport products between the various stages of the process are subject to varying temperatures. An increase in temperature causes pipes to expand and attempt to increase in length, and a decrease in temperature has the reverse effect. If the pipes are rigidly mounted then the forces resulting from temperature changes stress the mountings and can lead to damage. If the pipes are loosely mounted then they may buckle or move in an uncontrolled manner and take up undesirable orientations.

One way of controlling the expansion of lengths of pipe is to make the pipe in two sections which are telescopically joined by a sealing coupling. An example of such a telescopic coupling is shown in U.S. Pat. No. 5,106,129. In this document the two pipe sections are each fitted with an end collar at the ends to be connected. A tubular connecting piece with a diameter less than the inner diameter of the end collars is arranged inside the end collars to bridge the gap between the two pipe ends. The tubular connecting piece carries one sealing ring or a pair of adjacent sealing rings supported on biasing rings and retained in grooves on its external surface at each end. These sealing rings co-operate with the inner surfaces of the end collars and the sides of the retaining grooves to prevent fluid from leaking. This sealing coupling can form a seal between pipes which are angularly misaligned and permits axial movement between the parts. As the angle between the sealing coupling and the end collar changes from being parallel then the forces exerted on the sealing rings by the inner surfaces varies around their perimeters. In the case where pairs of sealing rings are used, at one point the force on the outer sealing ring is at its greatest while at the same point the force on the inner sealing ring is at its least. At the same time at a diametrically opposite point the force on the outer sealing ring is at its least and at the same point the force on the inner sealing ring is at its greatest. These asymmetric forces tend to move the rings out of alignment so that they are no longer concentric—neither with each other nor with the sealing coupling. This eccentricity is required to accommodate the increase sealing surface exposed by the misalignment. The maximum eccentricity is determined by the resilience of the biasing rings, the internal diameter of the sealing rings, the depth of the sealing rings and the depth of their retaining grooves.

The degree of misalignment which the sealing coupling can accommodate is limited by the angle a line between the seal lips in their most compressed position and the outer diameter of the grooves makes with the longitudinal axis of the sealing coupling. Any misalignment greater than this angle would cause the seal carriers to contact the inner surfaces of the end collars and damage would result. This damage would eventually cause the seal to fail.

Misalignment is also limited by the elasticity of the seal rings, as the sealing is dependent on the ability of the seal rings to be deformed by the stresses caused by the misalignment, yet at the same time be able to still exert an adequate sealing force on the larger sealing area exposed by the misalignment. A large misalignment requires a large deformation of the seal rings which requires a high degree of elasticity in the circumferential direction to allow the rings to expand. U.S. Pat. No. 5,106,129 shows various seal ring arrangements. In the arrangements which appear to be designed for harsh service, this high elasticity is provided by using split seal rings of hard, non-wearing material such as Teflon (™) or metal. For an effective seal the split seal rings should be aligned such that the splits in sets of rings are not aligned. This can cause problems in service as the rings are free to rotate and may become aligned which can lead to a reduced resistance to leakage. In the case where a combination of a split sealing ring and an unsplit sealing ring is used, then the limited elasticity of the unsplit sealing ring reduces the degree of misalignment that the sealing coupling can accommodate. This is because the solid sealing ring would eventually completely lose contact with the inner surface of the end collar leading to a leak. Another disadvantage with these seals is that contain several different parts which co-operate to form a seal and that these parts have to be very accurately made and their relative sizes closely defined to ensure the desired degree of sealing. Furthermore, the effectiveness of the seal depends on the sealing rings sealing against the sides of the sealing grooves which requires a high standard of finish and hence expensive machining.

An object of the invention is to provide an expansion unit for joining pipes which can easily be adjusted to provide a seal against different pressures. A further object of the invention is to provide an expansion unit which seals against axial, radial and angular misalignments. A further object of the invention is to provide an expansion unit which uses a limited number of different sealing parts.

In accordance with the invention, these objects are accomplished in an expansion unit for joining two pipes which comprises a housing which contains two sealing arrangements each comprising a number of sealing rings of two different diameters, placed alternately side by side, with one size of ring sealing against a surface of the housing, the other size of ring sealing against the pipe, the rings having co-operating side surfaces which form a mutual seal between adjacent rings, and adjacent rings being able to move in the radial direction with respect to each other.

The expansion unit formed in accordance with the invention has a number of advantages. The use of only two types of sealing rings in each sealing arrangement reduces manufacturing and maintenance costs. It also makes it easy to manufacture expansion units with different resistance to leakage as the simple addition of more sealing rings can be used to increase the resistance to leakage.

BRIEF DESCRIPTION OF THE DRAWINGS

The invention will now be described by way of example and with reference to the accompanying drawings in which:

FIG. 1 is a view of two pipes of equal diameter being joined by an expansion unit in accordance with the invention.

FIG. 2b is a cross-section through a guide ring;

FIG. 2c is a cross-section through an interior sealing ring;

FIG. 2d is a cross-section through an exterior sealing ring; and

FIG. 3 is a cross-section through a seal arrangement of a second type.

DETAILED DESCRIPTION

Figure 2A:
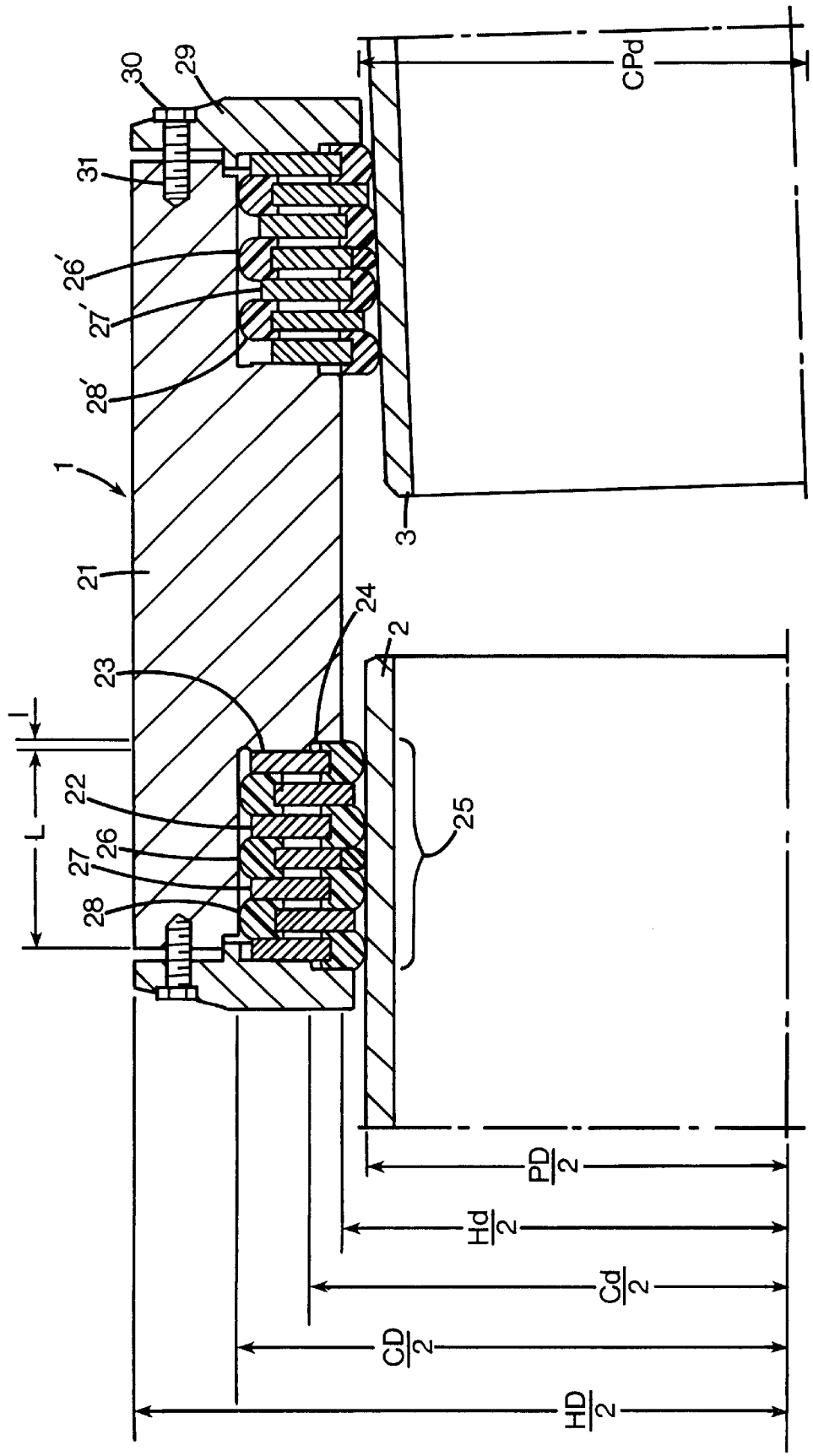
FIG. 2a is a cross-section through the expansion unit show in FIG. 1.

FIG. 1 illustrates an expansion unit 1 which receives the ends of pipe 2 and pipe 3 both of which have the same outer diameter PD. Expansion unit 1 is shown supported in a fixed mounting bracket 4 of a type known in the prior art which does not form part of the invention. It is of course possible for expansion unit 1 to be mounted in a self-aligning bracket of the type known in the prior art and it is equally possible that one or more of pipes 2, 3 are mounted in a bracket as well as, or instead of, the expansion unit 1.

FIG. 2a shows an enlarged cross-section through expansion unit 1 shown in FIG. 1. Expansion unit 1 comprises a cylindrical hollow housing 21 with an outer diameter HD, an inner diameter Hd and wall thickness of ½ (HD-Hd). Inner diameter Hd is greater than pipe outer diameter PD. The length of housing 21 has no bearing on the present invention as it can be varied as required, depending on the use to which expansion unit 1 is to be put. Each end of housing 21 has its interior diameter enlarged to form an annular cavity 22, with cylindrical surface 22a, of diameter CD which is substantially concentric with the longitudinal axis of housing 21 and which extends a distance L into the housing 21. At the bottom of cavity 22, a shoulder 23 is formed which leaves an annular cavity 24 of diameter Cd and length l with an annular end surface 24a. Each cavity 22 contains a sealing arrangement 25 which comprises alternating interior sealing rings 27, 27' and exterior sealing rings 28, 28' which in this embodiment surround a guide ring 26, 26'. As shown in FIG. 2b, guide ring 26, 26' is a composite ring made of metal and a low friction material such as PTFE and has an inner diameter Gd which is the same as that of the outer diameter PD of pipes 2, 3. The outer diameter GD of guide ring 26, 26' is the same as cavity diameter CD, so guide ring 26, 26' is in contact with both housing 21 and pipe 2, 3 between which a seal is to be made. Guide ring 26, 26' comprises three concentric rings of material, the inner 26a, 26a' and outer 26 c, 26c' rings being made of low friction sealing material while the central, stiffening ring 26b, 26b' is made of metal, preferably steel but can be made of any suitable material with due regard being paid to the corrosive effects of the fluids intended to be transported through the pipes. Outer ring 26c, 26c' has an inner diameter GOd and is wider than inner and central rings 26a, 26a', 26b, 26b' so that its side surfaces 26f, 26f' protrude said distance l beyond the side surfaces 26d, 26d', 26e, 26e' of inner and central rings 26a, 26a', 26b, 26b'.

An interior sealing ring 27, 27' is positioned on each side of guide ring 26, 26' and in contact with it. As can be seen from FIG. 2b, interior sealing ring 27, 27' comprises two concentric rings comprised of metal and a low friction sealing material. The outer ring 27c, 27c' is a stiffening ring made of metal and has and outer diameter ID which is less than CD and which is greater than the inner diameter GOd of outer ring 26c, 26c' of guide ring 26, 26'. As will be seen later, the difference in diameter between ID and GOd is a factor which controls the degree of misalignment that the expansion unit can accommodate. The inner ring 27a, 27a' is made of a low friction sealing material and has a nominal inner diameter which is the same as the outer diameter PD of pipes 2, 3. Inner ring 27a, 27a' has the same width as outer ring 26c, 26c' of guide ring 26, 26'. Outer ring 27c, 27c' has the same width as inner ring 26a, 26a' of guide ring 26, 26', so that the side surfaces 27d, 27d' of inner ring 27a, 27a' protrude said distance l beyond the side surfaces 27f, 27f' of outer ring 27c, 27c'.

An exterior sealing ring 28, 28' is positioned in contact with the side of interior sealing ring 27, 27' which is not in contact with guide ring 26, 26'. As can be seen in FIG. 2c, exterior sealing ring 28, 28' comprises two concentric rings comprised of metal and a low friction sealing material. The outer ring 28c, 28c' is made of low friction sealing material and has an outer diameter EOD which is nominally the same as CD and has an inner diameter EOd which is less than the maximum diameter ID of interior sealing ring 27, 27'. As will be seen later, the difference in diameter between ID and EOd is a factor which controls the degree of misalignment that the expansion unit can accommodate. The inner ring 28a, 28a' is a stiffening ring made of metal and has a inner diameter which is greater than the outer diameter PD of pipes 2, 3 but which is less than the outer diameter of inner ring 27a, 27a'. Outer ring 28c, 28c' has the same width as outer ring 26c, 26c' of guide ring 26, 26' and inner ring 27a, 27a' of interior sealing ring 27, 27'. Inner ring 28a, 28a' has the same width as inner ring 26a, 26a' of guide ring 26, 26' and outer ring 27c, 27c' of interior sealing ring 27, 27', so that the side surfaces 28f, 28f' of outer ring 28c, 28c' protrude said distance l beyond the side surfaces 28d, 28d' of inner ring 28a, 28a'.

In the embodiment shown in FIG. 2, a further interior sealing ring 27, 27' is positioned next to each of the exterior sealing rings 28, 28'.

An annular cover plate 29 is mounted on each end of housing 21 in any suitable manner, for example by bolts 30 threaded into holes 31 in housing 21. The inner diameter CPd of cover plate 29 is greater than pipe outer diameter PD and is preferably the same as housing inner diameter Hd. Cover plates 29 have an inner face 32 intended to thrust against the outermost interior sealing ring 27, 27' when the expansion coupling is in use. Inner face 32 has a groove 33 which extends radially from the inner diameter CPd to a distance which is greater than the distance that the inner ring 27a, 27a' of interior sealing ring 27, 27' extends radially, and which is less than the outer diameter ID of interior sealing ring 27, 27'. The depth of groove 33 is said distance l and the bottom of groove 33 is an annular surface 33a. By varying the tightening torque on bolts 30 it is possible to adjust the force between the sealing rings (27, 27', 28, 28') and hence the resistance to leakage of seal arrangement 25. Any other suitable fixing means for cover plate 29 can be used, for example it can be threaded onto the ends of housing 21. Furthermore, as is known from prior art, spring biasing means can be placed between cover plate 29 and the sealing rings (27, 27', 28, 28') to provide a constant sealing thrust despite temperature changes.

The sealing arrangements 25 of expansion coupling 1 work in the following manner:

the inner sealing rings 26, 26a', 27, 27a', which are comprised in guide rings 26, 26' and interior sealing rings 27, 27' are intended to form seals on the outer walls of pipes 2, 3. The outer sealing rings 26c, 26c', 28c, 28c' of guide rings 26, 26' and exterior sealing rings 28, 28' are intended to form seals on the wall of cavity 22. The protruding surfaces 27d, 27d', 26f, 26f', 28f, 28f' of the inner and outer sealing rings 27a, 27a', 26c, 26c', 28c, 28c' contact the non-protruding surfaces 26d, 26e, 27f, 27f', 28d, 28d' of adjacent rings or the end walls of annular cavity 24 or groove 33 to form seals between rings, between rings and housing 21, and between rings and cover plate 32. The resistance to leakage of sealing arrangements 25 depends on the force exerted by cover plate towards the sealing arrangement. This force compresses the sealing rings 26c, 26c', 27a, 27a', 28c, 28c' between metal surfaces 26b, 26b', 27c, 27c', 28a, 28a', 24, 33. An increase on this force deforms sealing rings 26c, 26c', 27a, 27a', 28c, 28c' so that they press more firmly on said surfaces 26b, 26b', 27c, 27c', 28a, 28a', 24, 33, thereby increasing the resistance to leaks.

As can be seen in FIG. 2, pipe 3 is angularly misaligned with respect to expansion coupling 1. The use of sideways protruding sealing surfaces means that the interior and exterior sealing rings 27', 28' can move in the radial direction relative to each other and the guide ring 26'. This movement is required to allow angular misalignment of the pipes. Guide ring 26' and exterior sealing rings 28' remains concentric with the longitudinal axis of housing 21 and guide ring 26' acts as a pivot about which pipe 3 can rotate. Internal sealing rings 27' on misaligned seal arrangement 25' follow the outer surface of pipe 3 and move to positions which are eccentric with respect to the longitudinal axis of housing 21.

The maximum permitted axial misalignment is limited by:

the clearance between the non-sealing diameters of sealing rings and the opposing pipe or housing surface—as the angular misalignment increases this clearance which was symmetrical becomes asymmetric with the clearance increasing to a maximum at one point on each ring and decreasing to zero at a diametrically opposed point;

the clearance between protruding sealing surfaces on adjacent rings or between the sealing surfaces and the housing and cover plate—as the angular misalignment increases this clearance which was symmetrical becomes asymmetrical with the clearance increasing to a maximum at one point on each ring and decreasing to zero at a diametrically opposed point;

the clearance between the pipe ends and the interior diameter Hd of housing 21 and the interior diameter CPd of cover plate 29—as the misalignment increase the pipe end approaches the inner diameter of housing 21 and the outer surface of the pipes comes closer to contacting the inner diameter CPd of cover plate 29—maximum permitted misalignment occurs when the pipe contacts one of these parts. The length of pipe inserted through seal arrangements 25 determines if contact first takes place between the pipe end and the inner diameter or if contact first takes place between the pipe and the inner surface of cover plate 29.

Axial expansion of pipes 2, 3 can be accommodated until the pipe ends meet inside expansion coupling 1.

In order to provide sealing when expansion unit 1 and pipes 2 are parallel with each other but are not concentric, inner ring 26a, 26a' and outer ring 26c, 26c' of guide ring 26, 26' can be made of a sealing material which is more easily compressed than the sealing material used in interior and exterior sealing rings 27, 27', 28, 28'. This allows the guide rings to also move along with all the other rings to an eccentric position with respect to the longitudinal axis of housing 21. The maximum eccentricity is limited by the compressibility of the material used in the construction of rings 26, 26a', 26, 26c' and, as above, the clearance between the non-sealing diameters of sealing rings and the opposing pipe or housing surface—as the eccentricity increases this clearance which was symmetrical becomes asymmetric with the clearance increasing to a maximum at one point on each ring and decreasing to zero at a diametrically opposed point.

Any combination of eccentric alignment and angular misalignment can be accommodated by the present invention until the combined misalignments cause any of the various rings to reach the limit of their movements.

FIG. 3 shows a sealing arrangement 35 in which the guide ring 36 and sealing rings 37, 38 have flat sides 37d, 38d which act as sealing surfaces without the use of protruding sealing rings. This embodiment allows a cheaper construction as the rings are easier to produce and the range of misalignment which this embodiment can accommodate is increased. However the sealing forces between adjacent rings is spread over a larger area 37d, 38d than in the previous embodiment which means that for a given resistance to leakage these rings have to be more tightly forced together than in the sealing arrangement 25 shown in the first embodiment. This causes increased friction between the rings means that misalignment are not corrected until the forces exerted by them have reached a higher value with respect to the forces required in the first embodiment.

It is possible to very the construction of the components of the sealing arrangements such that a guide ring 26, 26' is adjacent to an exterior sealing ring 28, 28' instead of an interior sealing ring 27, 27'. The number and type of sealing rings can also be varied depending on the strength of sealing required—and increase in the number of rings leading to an increase in the resistance to leaks.

It is also possible to not use a special guide ring 26, 26', 36 but use an extra interior or exterior sealing ring 27, 27', 28, 28', 37, 38 instead.

Although the expansion unit of the invention has described with reference to an external unit which surrounds the pipes it is intended to join, it is also possible to produce it in internal form for mounting inside the pipes it is intended to join. It is also possible to produce it in hybrid form with one end intended to fit over a pipe end and the other end intended to fit into a pipe end. Furthermore it is not intended that the expansion unit of the invention be limited to joining pipes of equal size but it can be modified as required to join pipes of any size.

We claim:

1. An expansion coupling for connecting a first conduit to a second conduit, comprising:

a housing having opposite open ends, the housing having an inside surface; and a sealing device comprising at least three symmetrically arranged sealing rings, the sealing device comprising:

an interior sealing ring for sealing against an outside surface of the first conduit disposed inside the housing, the interior sealing ring having a first outer diameter and a first inner diameter, the interior sealing ring having a stiff first outer ring and an radially inwardly directed resilient first inner ring attached to the first outer ring, the first outer ring having a first outer ring width and the first inner ring having a first inner ring width, the first inner ring width being greater than the first outer ring width;

an exterior sealing ring for sealing against the inside surface of the housing, the exterior sealing ring having a second outer diameter and a second inner diameter, the second outer diameter being greater than the first outer diameter, the second inner diameter being greater than the first inner diameter, the second inner diameter being smaller than the first outer diameter, the outer sealing ring having a stiff second inner ring and an radially outwardly directed resilient second outer ring attached to the second inner ring, the second inner ring having a second inner ring width and the second outer ring having a second outer ring width, the second outer ring width being greater than the second inner ring width, the second outer ring width being identical to the first inner ring width;

the first inner ring having a first sealing side surface for sealing against the second inner ring of the exterior sealing ring; and the second outer ring having a second sealing side surface for sealing against the first outer ring of the interior sealing ring, the second sealing side being parallel to the first sealing side surface, the interior and the exterior sealing rings being radially displaceable relative to one another to accommodate any misalignment between the first and second conduits.

2. The expansion coupling according to claim 1 wherein the sealing device further comprises a guide ring that is surrounded by a plurality of symmetrically arranged and alternatingly positioned interior sealing rings and exterior sealing rings.

3. The expansion coupling according to claim 1 wherein the radially inwardly facing sealing surface and the radially outwardly facing sealing surface are made of a low friction material.

4. The expansion coupling according to claim 3 wherein the low friction material is polytetrafluoroethylene.

5. The expansion coupling according to claim 2 wherein the radially inwardly facing sealing surface, the radially outwardly facing sealing surface and the guide ring are made of a low friction material.

6. The expansion coupling according to claim 5 wherein the low friction material is polytetrafluoroethylene.

7. The expansion coupling according to claim 2 wherein the radially inwardly facing sealing surface, the radially outwardly facing sealing surface and the guide ring each comprises an annular metal ring.

8. The expansion coupling according to claim 1 wherein the housing comprises biasing means for adjusting a sealing force in the sealing device.

* * * * *